United States Patent
Wasson et al.

(10) Patent No.: US 9,563,670 B2
(45) Date of Patent: Feb. 7, 2017

(54) DATA ANALYTICS SYSTEM

(71) Applicant: Science Applications International Corporation, San Deigo, CA (US)

(72) Inventors: Glenn S. Wasson, Cozet, VA (US); Surusheh Covington, Charlottesville, VA (US); Adam Silva, Charlottesville, VA (US)

(73) Assignee: Leidos, Inc., Reston, VA (US)

( * ) Notice: Subject to any disclaimer, the term of this patent is extended or adjusted under 35 U.S.C. 154(b) by 184 days.

(21) Appl. No.: 13/830,230

(22) Filed: Mar. 14, 2013

(65) Prior Publication Data

US 2014/0280142 A1    Sep. 18, 2014

(51) Int. Cl.
   *G06F 17/30*    (2006.01)

(52) U.S. Cl.
   CPC ..... *G06F 17/30539* (2013.01); *G06F 17/3071* (2013.01); *G06F 17/30864* (2013.01)

(58) Field of Classification Search
   CPC ................. G06F 17/3071; G06F 17/30864
   See application file for complete search history.

(56) References Cited

U.S. PATENT DOCUMENTS

| | | | |
|---|---|---|---|
| 2012/0303625 A1* | 11/2012 | Ciodaru et al. | 707/740 |
| 2014/0063237 A1* | 3/2014 | Stone | H04N 7/181 348/143 |
| 2014/0078163 A1* | 3/2014 | Cammert et al. | 345/589 |
| 2014/0212854 A1* | 7/2014 | Divakaran et al. | 434/236 |
| 2014/0229482 A1* | 8/2014 | Milenova | G06F 17/30289 707/737 |
| 2014/0279762 A1* | 9/2014 | Xaypanya et al. | 706/12 |

* cited by examiner

*Primary Examiner* — Rehana Perveen
*Assistant Examiner* — Raheem Hoffler
(74) *Attorney, Agent, or Firm* — Banner & Witcoff, Ltd.

(57) ABSTRACT

Methods, computer readable media, and apparatuses for building data models and performing model-based analytics are presented. A data analytics system may be implemented including software components to provide a data analytics platform and/or a data analytics programming interface. The components of the data analytics system may allow users to create and execute software applications to build data models model-based analytics functionality such as classification and prediction. For example, a programming interface may allow users to build data models of various predetermined model types, such as statistical data models, spatial statistical data models, graphical data models, pattern mining data models, clustering data models, and machine learning data models, among others, based on an input data set. A parallel computing infrastructure, for example, a cloud computing environment, may be used to build data models and perform model-based analytics with distributed processing and distributed storage.

21 Claims, 10 Drawing Sheets

| Percent | Frequency | Pattern |
|---|---|---|
| 11% | 0.108714 | Carrier = MAERSK LINE |
| 1% | 0.01154219 | Buyer = INTERNATIONAL |
| < 1% | 0.0048180094 | Country = PAKISTAN |
| < 1% | 0.0036365867 | Port = NANSHA |
| < 1% | 0.0029000628 | Carrier = MAERSK LINE / Port = NANSHA |
| < 1% | 0.0017952277 | Buyer = INTERNATIONAL / Carrier = MAERSK LINE |
| < 1% | 0.0009513434 | Country = PAKISTAN / Port = NANSHA |
| < 1% | 0.0006804912 | Country = PAKISTAN / Carrier = MAERSK LINE / Port = NANSHA |
| < 1% | 0.0003060885 | Country = PAKISTAN / Buyer = INTERNATIONAL |
| < 1% | 0.0001841311 | Buyer = INTERNATIONAL / Port = NANSHA |

FIG. 5D

DATA ANALYTICS SYSTEM

BACKGROUND

Big data analytics involves the analysis of large and complex data sets that may frustrate traditional data analysis techniques. Although many organizations now produce or have access to large amounts of data, such as sensor data, organization data, or transaction records, big data analytics involves many challenges to organizations that may attempt to collect, store, and analyze large data sets with the limited computing resources and/or storage resources available to the organization. Even analyses of very large data sets which may be successful may involve more computing resources and may take more time than can be afforded by the organization.

Data models may be created as a tool to analyze large quantities of data to perform big data analytics. Data models may describe the behaviors observed within an input data set, such that the data model may be used to compare and classify new data against the observed behaviors of the input data set. However, like other big data analytics processes, data modeling techniques can be time intensive and resource intensive to develop, deploy, and execute. Moreover, many data model building activities require the creation of many different data models using many different data sets, in order to better analyze the data and discover the patterns and variables underlying the data. Unfortunately, many organizations lack the time, computing resources, infrastructure, or scalability to perform the processing and storage required to create and use data models based on large amounts of data. As a result, large quantities of data available to organizations are often discarded without any analysis, or are misunderstood by organizations without the resources to perform a meaningful analysis of the data.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Described herein are methods, computer readable media, and apparatuses for building data models and performing model-based analytics. A data analytics system may be implemented including software components to provide a data analytics platform and/or a data analytics programming interface. The components of the data analytics system may allow users to create and execute software applications to build data models and perform model-based analytics functionality such as classification and prediction. For example, a programming interface may allow users to build data models of various predetermined model types, such as statistical data models, spatial statistical data models, graphical data models, pattern mining data models, clustering data models, and machine learning data models, and others, based on an input data set. A parallel computing infrastructure, for example, a cloud computing environment, may be used to build data models and perform model-based analytics by using distributed processing and distributed storage systems. In certain embodiments, users may select predefined model types and/or data record grouping parameters via a programming interface or a user interface to build multiple data models based on the same input data set. The data analytics system also may include components to allow existing data models to be retrieved and used for model-based analytics on new data streams.

BRIEF DESCRIPTION OF THE DRAWINGS

The present disclosure is illustrated by way of example and not limited in the accompanying figures in which like reference numerals indicate similar elements and in which:

FIG. 5D is a graphical representation of a pattern mining model, according to one or more aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
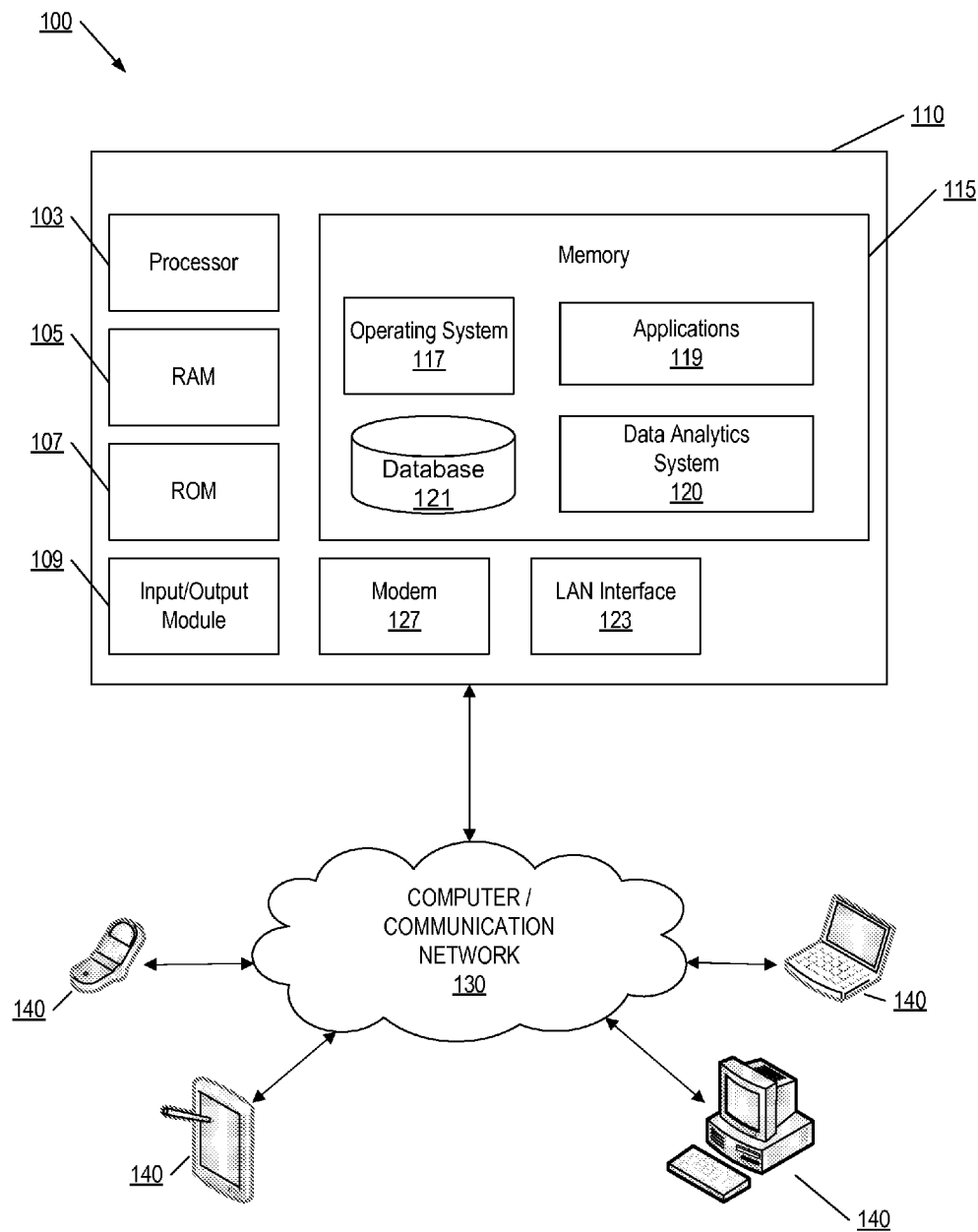
FIG. 1 illustrates example computing hardware and software, and an example computer system in which various aspects of the disclosure may be implemented.

FIG. 1 illustrates a block diagram of a computing device 110 (e.g., computer server, personal computer, mobile device, etc.) including a data analytics system 120 (e.g., a data analytics software framework) in an example computing environment 100. As discussed herein, a data analytics system 120 may include software components providing an analytics platform and/or programming interface to allow users to create and execute software applications to build data models and perform model-based analytics functionality. The data analytics system 120 may include components to create (or build) data models, such as an application programming interface (API) to allow users to create data models of various predetermined model types (e.g., statistical, spatial statistical, graph, pattern, clustering, and machine learning models) based on an input data set. A data analytics system 120 may use a parallel computing infrastructure (e.g., a cloud computing environment) to quickly build models using distributed computing techniques. Users may further group input data in a variety of ways and may create multiple data models based on the same input data set.

The data analytics system 120 also may include components to allow existing data models to be retrieved and used to perform model-based analytics on new data streams. For example, new data may be classified with respect to one or more existing data models, may be determined to be an anomaly that does not fit one or more existing data models, and/or may be used to predict future or unknown data based on existing data models. The data analytics system 120 may include programming interfaces to allow users to define and develop classifiers and predictors for the model-based analytics, as well as additional components for receiving and storing new streaming data sets and analyzing the new data against the previously stored data models.

The computing device 110 storing the data analytics system 120 may be used in accordance with one or more illustrative embodiments of the disclosure, for example, to build data models and perform model-based analytics. In certain examples, the computing device 110 may be configured as a server (e.g., a web server or application server), configured to the functionality of the data analytics system 120 to one or more client devices 140 over a communication network 130. In other examples, the device 110 may be configured as a client device running one or more client applications to provide data model creation and model analytics functionality to users.

Device 110 may have a processor 103 for controlling overall operation of the device and its associated components, including random access memory (RAM) 105, read-only memory (ROM) 107, input/output (I/O) module 109, and memory 115. I/O module 109 may include a microphone, mouse, keypad, touch screen, scanner, optical reader, and/or stylus (or other input device(s)) through which a user of the system 110 may provide input, and may also include one or more of a speaker for providing audio output and a video display device (e.g., an attached monitor for a personal computer, integrated screen for a mobile device, etc.) for providing textual, audiovisual, and/or graphical output. Software may be stored within memory 115 and/or other storage system to provide instructions to processor 103 for enabling device 110 to perform various functions. For example, in addition to the data analytics system 120, memory 115 may store software used by the device 110, such as an operating system 117, application programs 119, and an associated database 121. Alternatively, some or all of the computer executable instructions for device 110 may be embodied in hardware or firmware (not shown).

The computing device 110 may operate in a networked environment supporting connections to one or more remote computers, such as terminal devices 140. The device 110 may be connected to a local area network (LAN) via a LAN interface or adapter 123, and/or a wide area network (WAN) via a modem 127 or other network interface for establishing communications over the WAN, to establish communications with one or more computer/communications networks 130 (e.g., the Internet or any other suitable computer or communication network). It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computer/communication network 130 (along with one or more additional networks used in certain embodiments) may be any suitable computer network including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communication network 130 may include other suitable communications networks such as cable networks, dial-up or wireless cellular telephone networks, satellite networks, etc.

The devices and networks of computing environment 100 may be configured to provide a system for building data models and performing model-based analytics, including receiving and storing input data for building data models and new data streams, defining data model types (e.g., statistical, spatial statistical, graph, pattern, clustering, etc.) and other data model characteristics, and retrieving previously stored data models and performing model-based analytics using the retrieved data models. In certain examples, a computing device 110 running the software of a data analytics system 120 may operate independently to support data model creation and model-based analytics to users via I/O module 109, and need not communicate with network 130 or any additional terminal devices 140. For instance, a standalone data modeling system 110 may include a computer program product stored by one or more computer-readable storage media to provide the functionality of the data analytics system 120 to users. In other examples, various components of the data analytics system 120 may be located within the computing device 110 and/or may be located remotely from the device 110 within the computing environment 100. In such examples, the computing device 110 and terminal devices 140 may be operated in a client-server configuration, for instance, communicating via a web-based or client-server application in which the computing device 110 includes a web server allowing the terminal devices 140 (e.g., personal computers, laptop computers, tablet computers, smartphones, PDA's, etc.) to incorporate various functionality and access other functionality of the data analytics system 120 via a web browser or other client application.

Figure 2A:
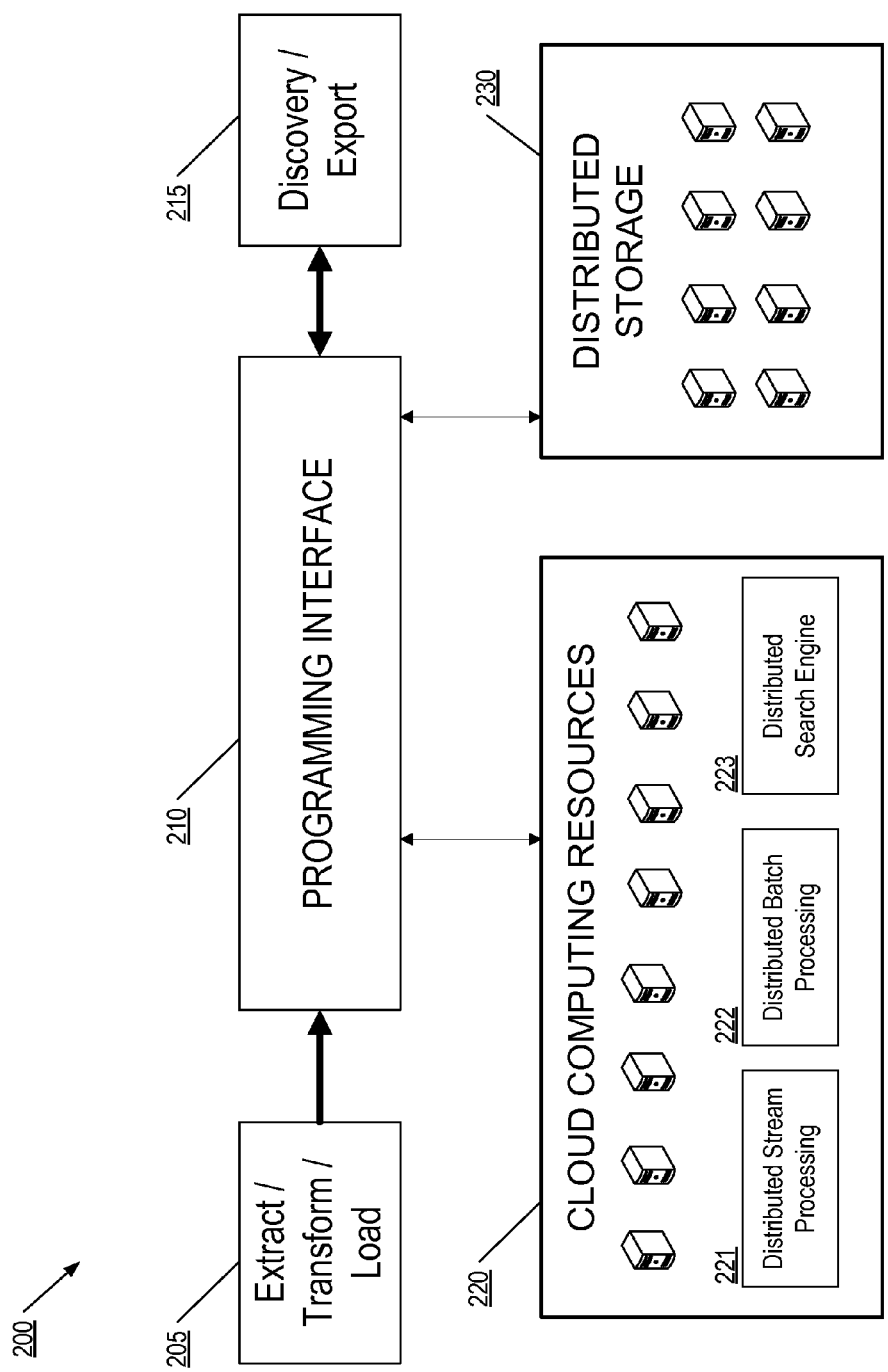
FIG. 2A illustrates an example diagram including system components on which various aspects of a data analytics system may be implemented.

FIG. 2A is a diagram illustrating the system components of an example data analytics system 200 in accordance with various aspects discussed herein. In this example, the data analytics system 200 includes application software components 205-215, having user-exposed interfaces that allow programmers and other users to write and use software applications to perform the functionality data analytics system 200, and infrastructure components 220-230 that may be configured to perform the underlying functionality without being directly accessible to users or programmers. The infrastructure components 220-230 may be configured to process large datasets requiring large computational cycles and dynamically varying data streams. As illustrated in FIG. 2A, the infrastructure components may include a parallel computing infrastructure (e.g., cloud computing environment 220), enabling the infrastructure components to execute decision processes faster and scale better than traditional multi-threaded, single server environments.

In this example, the data analytics system 200 includes a software application programming interface (API) 210. The software API 210 may be provided as an extendable API supporting functions to allow users to define and build custom data models, and write custom classification and prediction algorithms for model-based analytics. The software API 210 may be configured to support commonly used input formats and protocols, and also may support integration of legacy and external systems using custom transformations written by users. The software API 210 may hide the underlying infrastructure components 220-230 from users, so that users need not interface with the distributed systems programming components.

The data analytics software framework 200 also may include a discovery and export component 215 to provide integration with third-party or custom data visualization tools. For example, the discovery and export component 215 may be implemented as an API that includes a web-based visualization interface for visualization data models and running data analysis and verification queries.

In this example, the data analytics system 200 also includes a component 205 to perform extraction, transformation, and load functionality. The component 205 may include a control script to prepare new data streams into key/value record format that is common within the system 200. In this example, the extraction, transformation, and load functionality may execute as a process that is distributed across the underlying cloud computing infrastructure 220.

The cloud computing resources 220 in this example may include a set of computer servers configured to provide parallel processing for model building and model-based analytics functionality. The cloud computing resources 220 may include a distributed stream processing component 221 configured to provide a parallel processing environment within the cloud 220 capable of performing large processing tasks (e.g., generating data models). The cloud 220 also includes a distributed batch processing component 222 configured to provide a distributed, partially fault-tolerant, message passing system. The message passing system of the distributed batch processing component 222 may process continuous unbound streams of data, and may operate in real-time (or near real-time) to build data models and perform model-based analysis (e.g., classification and prediction). A distributed search engine component 223 may be included to index the outputs produced by the model building and model-based analysis functions performed within the data analytics system 200. The indices maintained by the distributed search engine 223 may be used by the discovery and export component 215 to support data visualization and model-based analysis (e.g., classification and prediction).

Each of the system components 205-230 shown in FIG. 2A may be configured to use one or more third-party software applications to perform its various functions. For example, the system components 205-230 may be designed and implemented to various underlying vendor-specific software tools, by providing user interfaces and programming interfaces through which such tools may be invoked, without directly exposing the underlying software tools to the users of the system 200.

In this example, the data analytics system 200 also includes a distributed storage 230. The distributed storage 230 may include one or more data servers and other storage devices configured to provide a distributed and fault-tolerant storage system designed to store and replicate large amounts of data, such as new data streams, data models, classifications, and predictions.

At the bottom layers of the data analytics system 200, the storage component 230 may be provided using one or more distributed databases and/or file systems, for example, the Apache HBase distributed database and the Apache Hadoop Distributed File System (HDFS). The storage component 230 may be used to store inbound stream data, data models, and model-based analysis including classifications, predictions and alerts. The inbound stream data stored by the storage component 230 may first be processed by the ETL component 205, and stored in a structure optimized for model building. The storage component 230 also may provide a staging environment for model building processes that require multiple processing steps (e.g., graph models), and may be used to store output products in a format optimized for system querying.

As discussed below in FIG. 2B, the distributed stream processing component 221 may serve as a hub for routing application events within the system 200. The distributed stream processing component 221 also may process events requiring real-time processing, for example, fusing and persisting data, building models, and running model-based analytics such as classifications and predictions. The distributed stream processing component 221 may use the distributed computing infrastructure (e.g., cloud 220) to parallelize many simultaneous events across the computing devices of the cloud environment. One or more stream processing systems, such as Twitter Storm, capable of processing streams of new data and updating databases in real-time, may be used by the distributed stream processing component 221.

The distributed batch processing component 222 may use the MapReduce programming paradigm to provide the framework for distributed computing over large datasets, such as data sets for which multi-threaded applications cannot produce an answer in a reasonable amount of time. In certain examples, the distributed batch processing component 222 may be provided by Apache Hadoop, along with software bundles that do specialized MapReduce jobs on Hadoop. The Apache Hadoop software provides a Java-based implementation of MapReduce which may be integrated with the HDFS distributed file system discussed above. Using such tools, the distributed batch processing component 222 may iterate over terabytes of data (e.g., gigabytes or terabytes) and many records (e.g., millions or billions).

The software API 210 may be the primary interface through which users (e.g., software programmers, user interface designers, and other users) invoke the functionality of the data analytics system 200. The software API 210 may be written in Java and may depend on several Java libraries. In certain examples, the library dependencies may be resolved using the Apache Maven build and project management tool as the development environment. In such examples, the libraries may be registered and hosted in a public Maven repository available via the Internet. If the software API 210 is written in Java, it may use the Google GSON library to convert Java objects into JavaScript Object Notation (JSON)

representations. As discussed below, the JSON format may be the message serialization format used by the events within the system 200, and the HBase driver for communication with the Apache HBase distributed database.

Finally, the ETL component 205 may be implemented and controlled using UNIX shell scripts, and the discovery and export component 215 may execute in a web server and may use an application development framework such as Spring Framework. In this example, the ETL component 205 and the discovery and export component 215 may be consumers of the software API 210, and the software API 210 may integrate with the various stream processing components 221, batch processing components 222, and storage components 230 discussed above. The stream and batch processing components 221-222 also may be consumers of the API, as discussed below, to retrieve data from and store data to the storage component 230.

Figure 2B:
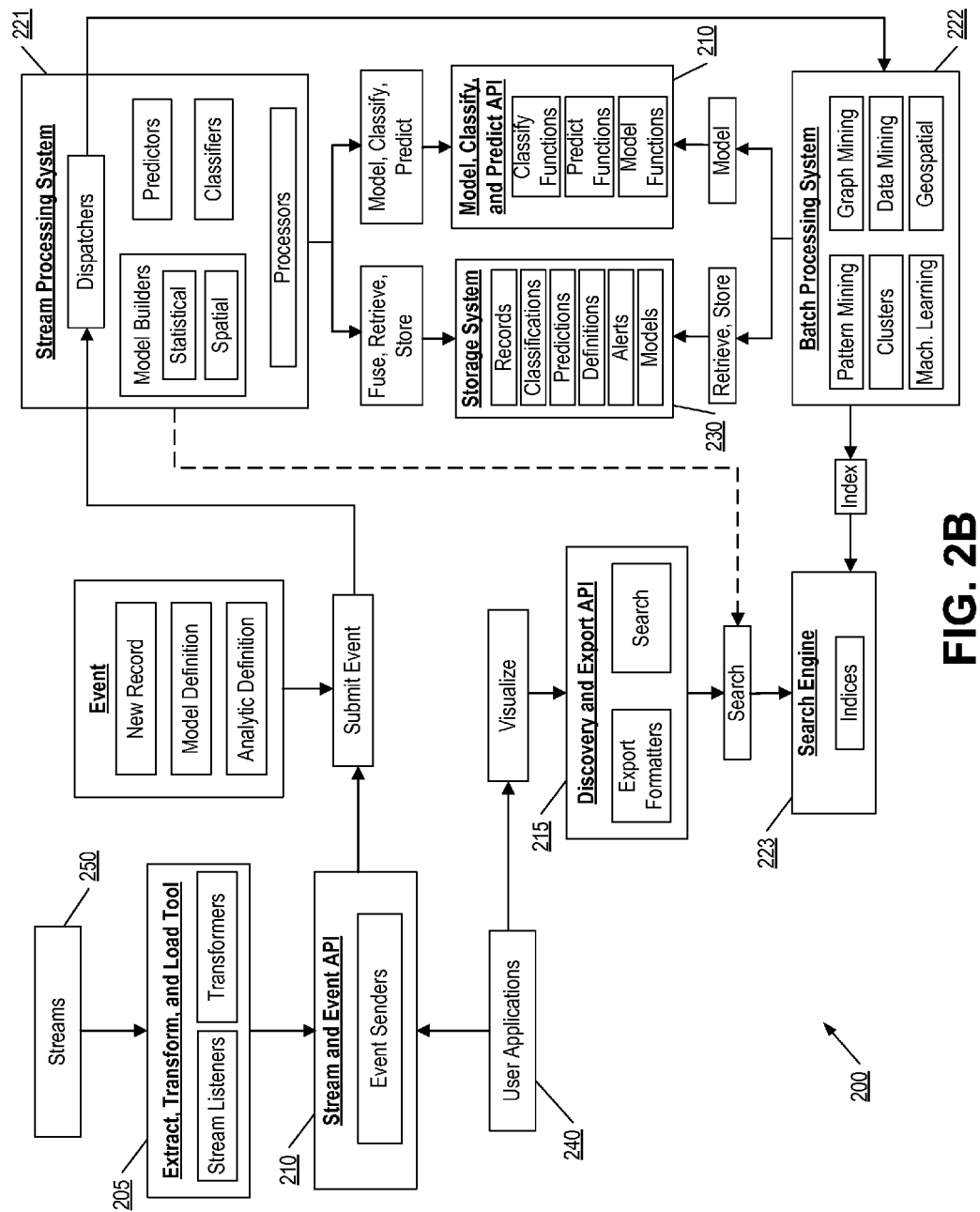
FIG. 2B illustrates an example software architecture on which various aspects of a data analytics system may be implemented.

FIG. 2B is a diagram illustrating an example software architecture that may be implemented using the system components of FIG. 2A. Each of the system components discussed above in FIG. 2A may be implemented as separate hardware, software, or a combination of hardware and software. In FIG. 2B, the example software architecture shown illustrates various software functions that may be performed by different system components, and shows interactions that may occur between the illustrative system components.

As shown in FIG. 2B, some or all of the components in this example may be event-driven software components configured to receive and execute functions in response to an event. Events may be initiated within the data analytics system 200, for example, by user actions received via user applications 240, or in response to an incoming data stream 250. System components 205-230 that are senders and/or consumers of events may be loosely coupled through private API objects, so that such system components 205-230 may communicate via programming interfaces rather than vendor-specific implementation classes. In certain examples, event communication may occur partially or entirely over TCP/IP. For instance, the event transmission may contain an event object serialized into JavaScript Object Notation (JSON) format, and each event object may contain data specific to its event type.

Within the data analytics system 200, events may be initiated by the extract, transform, and load (ETL) tool 205, by one or more user applications 240, and/or by other system components within the system 200. For example, the ETL tool 205 may use stream listeners and transformers to receive stream data and transform the data into a common format. In this example, a "data in" event initiating at the ETL tool 205 may signal the stream processing system 221 to fuse and/or store the received stream data. When new data arrives via a data stream 250, the data may be transformed by the ETL tool 205 into a unit of information referred to as a message. A message may represent a single transaction or single unit of information within a data stream, for example, a GPS location of a specific object at a specific time, which may be represented as a single line in comma-separated-value (CSV) text data or a single object in a JSON message. In certain examples, a data stream may have multiple types of messages that may be fused together by a common identifier (e.g. a person identifier or object associated with multiple messages). Within a message, every field may be identified by a key that may form the basis for how the message data is classified, modeled, stored, and retrieved in the data analytics system 200.

In the "data in" event, after the ETL tool 205 transforms the received data into message objects, the message objects are forwarded within the event to the stream processing system 221, where the message data is persisted into storage within the storage system 230. Stored message data, which may be referred to as records, may include unique record id values so that records may be identified and retrieved.

As another example, the data analytics system 200 may support a model event corresponding to a user-initiated request to build a data model. In this example, a user application 240 may provide user interfaces and/or programming interfaces via the software API 210 to allow users to invoke a function to initiate the building of a data model. The model event may execute code to determine either a processing mode (e.g., stream processing mode or batch processing mode), and then either signal the stream processing system 221 to begin continuously building a real-time data model, or may signal the batch processing system 222 to initiate a one-time model building function. After receiving a model event, the stream processing system 221 may first retrieve a model definition that specifies the type of data model that should be built and how the data model should be built. As discussed below, the software API 210 may support a plurality of predefined data model types (e.g., statistical, spatial statistical, graph, pattern, clustering, etc.) and may allow users to create additional custom data model types.

The data analytics system 200 also may support an analytic event corresponding to a user-initiated request to perform model-based analytics on one or more data models previously created and stored in the system. A user application 240 may provide user interfaces and/or programming interfaces via the software API 210 to allow users to perform model-based analytics functions. An analytic event may signal the stream processing system 221 begin analyzing, or to stop analyzing, a new data stream received via the ETL tool 205 or a previously stored data stream. As examples, the analytic event may correspond to requests to classify data streams, detect anomalous data streams, and/or predict likely behavior based on data streams. After receiving an analytic event, the stream processing system 221 may first retrieve an analytic definition that specifies the algorithm to run on each new data item and specifies one or more data models to compare against the new data items. As discussed below, the software API 210 may support a plurality of predefined and reusable analytics algorithms (e.g., classification and prediction algorithms), and may allow users to create and store additional custom data analytics algorithms.

Another example of a software architecture for a data analytics system in accordance is shown in Appendix A attached hereto. The software architecture described in Appendix A is represented in a different form than the software architecture shown in FIG. 2B, but may correspond to a similar (or the same) data analytics system 200 and set of logical software components described above in reference to FIGS. 2A and 2B. Appendix A includes a software object hierarchy, including the package hierarchy, class hierarchy, interface hierarchy, and enum hierarchy, for a Java implementation of one example of a data analytics system. The example object hierarchy shown in Appendix A includes a listing of each Java object name, and shows the relationships between the objects. Appendix B attached hereto provides examples of model definitions for several of the software objects shown in Appendix A. For example, Appendix B includes the Java object definitions for several model definition classes and analytics definition classes that may be implemented in the data analytics system (e.g., for Bayesian, data mining, and spatial data model types). Appendix B also includes the Java definitions for the AnalyticsEvent, DataEvent, and ModelEvent classes that may be implemented for event-based data analytics systems.

Figure 3:
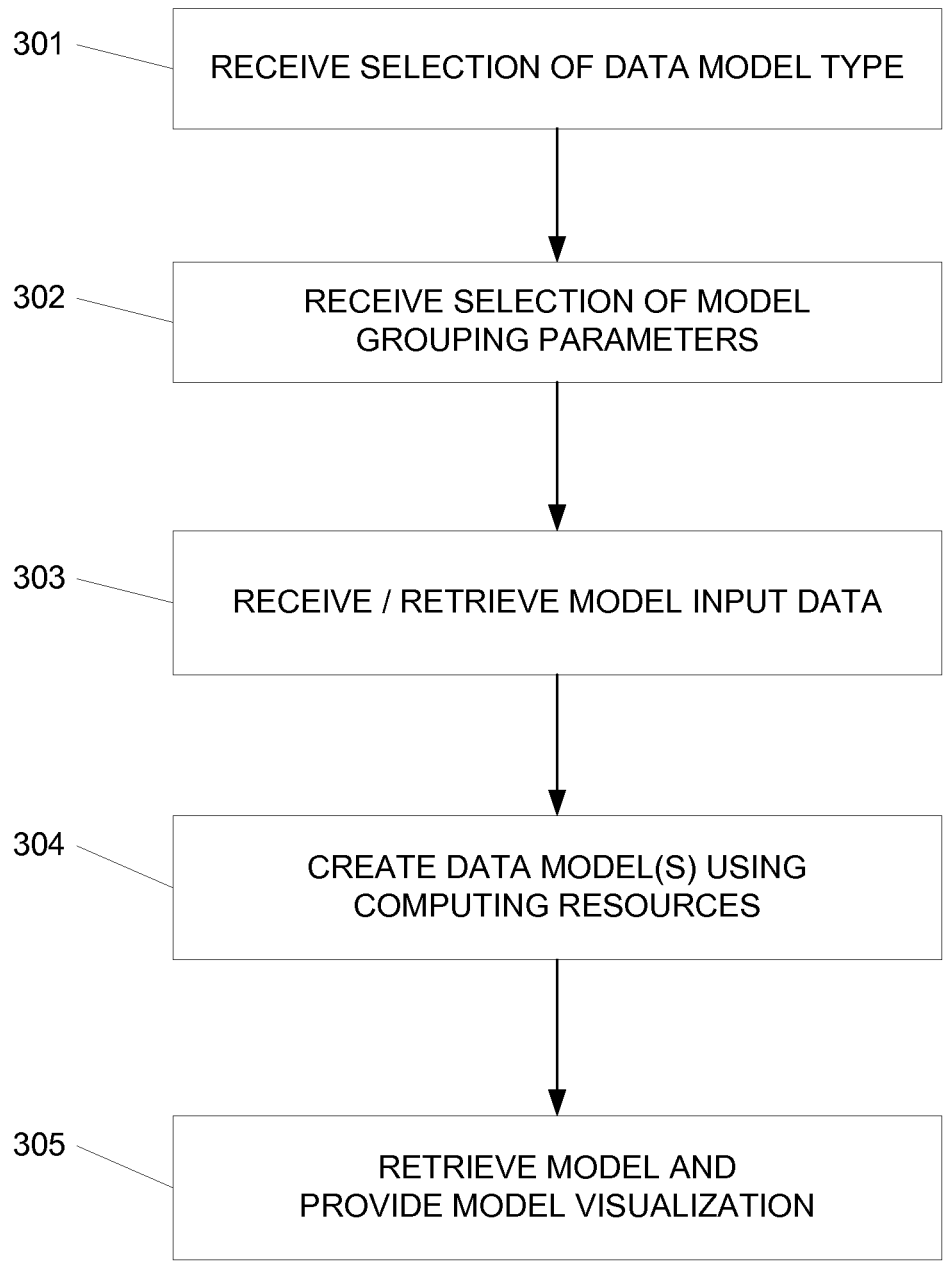
FIG. 3 is a flow diagram illustrating an example process for receiving model definition data and creating a data model using cloud resources, according to one or more aspects of the disclosure.

FIG. 3 illustrates a flow diagram for receiving model definition data and building data models in accordance with one or more illustrative aspects described herein. The embodiments described in reference to FIG. 3, and the other embodiments described herein, may be implemented by the system components and software described above in reference to FIGS. 2A-2B, for example, the ETL component 205, software API 210, discovery and export component 215, and distributed stream and batch processing components 221-222, along with other components. In certain examples, the steps and process described herein may be performed by and/or in combination with computing devices 110, for example, one or more servers of a data analytics system, in communication with one or more model building and model-based analytics client devices.

In step 301, a user selection of a data model type may be received, for example, via the software API 210. The software API 210 may provide one or more functions allowing programmers and other users to initiate the building of models using any of a plurality of predefined model types and/or custom user defined model types. For example, the software API 210 may support a model definition class and/or model definition functions that receive an input parameter corresponding to a model type.

Figure 5A:
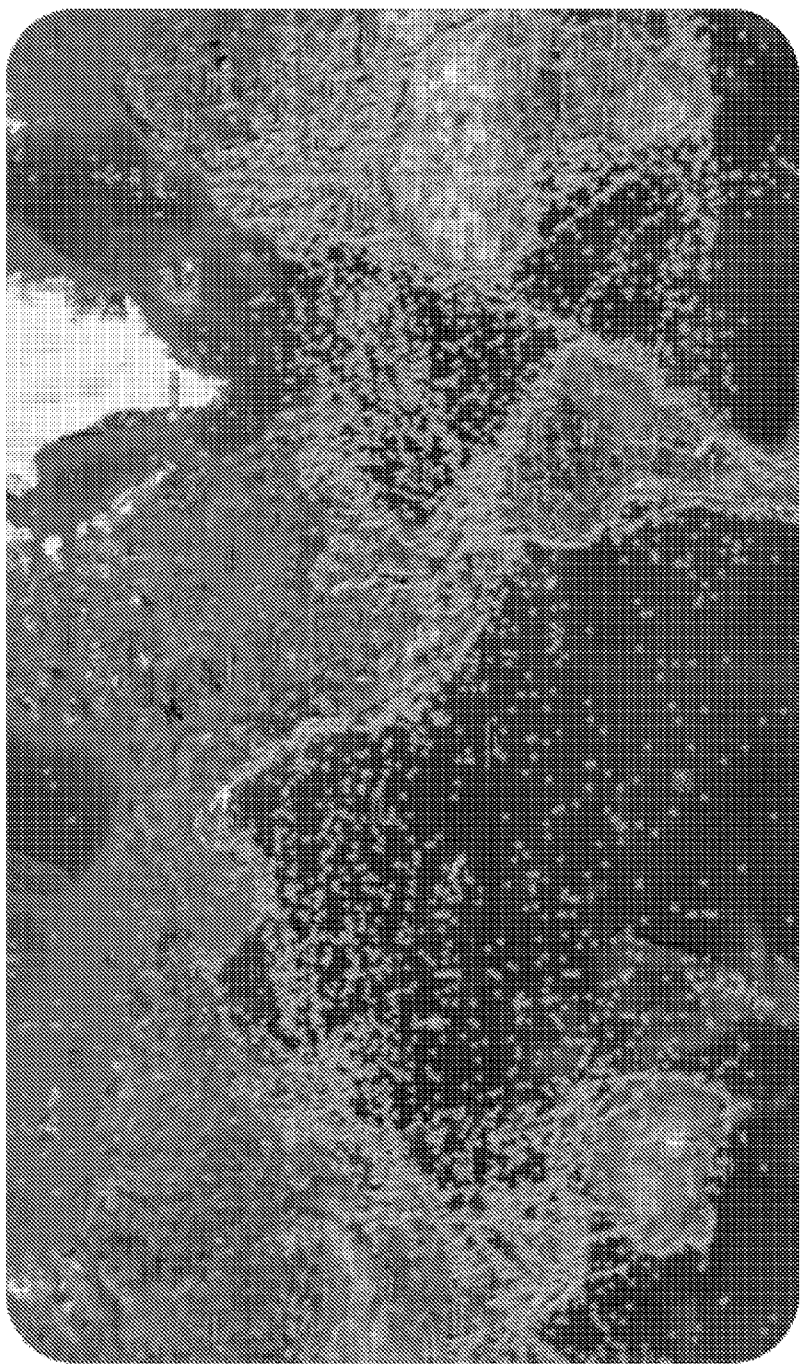
FIG. 5A is a graphical representation of an example set of location data, according to one or more aspects of the disclosure.

As described above, data models may include various different techniques for describing large quantities of data in a more compact and more manipulable form. An example of a large amount of raw shipping data is shown in FIG. 5A. In certain embodiments, the data analytics system 200 may include a namespace construct that allows users to organize domain data. For instance, the shipping data in this example may be designated with a "shipping" namespace, which may be separated (logically or physically) from other types of data stored within the system. If the same organization wanted to analyze banking and credit card fraud data, then these types of data can be separated into their own namespaces and/or fused into a single namespace. In such embodiments, the software API 210 may provide support for users to search for data streams and data models by namespace. Additionally, each column may be prefixed with the user specified namespace in order to maintain a distinction between column families from each namespace.

FIG. 5A shows a map presenting an example set of global location coordinates corresponding to a snapshot of ship GPS data received from a plurality of ship sensors at locations around the world. The location coordinate data in this example is only represented by dots on the map of FIG. 5A; however, the ship sensors may transmit additional data such as the ship identifier, destination, and speed of the ship. In such examples, ship data may be collected by ship sensors operating in different ships and transmitted periodically (e.g., every minute, every 5 minutes, every hour, etc.) to a ship data receiver configured to store and provide the shipping data to the data analytics system 200 as an input data stream.

Figure 5B:
FIG. 5B is a graphical representation of a spatial data model, according to one or more aspects of the disclosure.
Figure 5C:
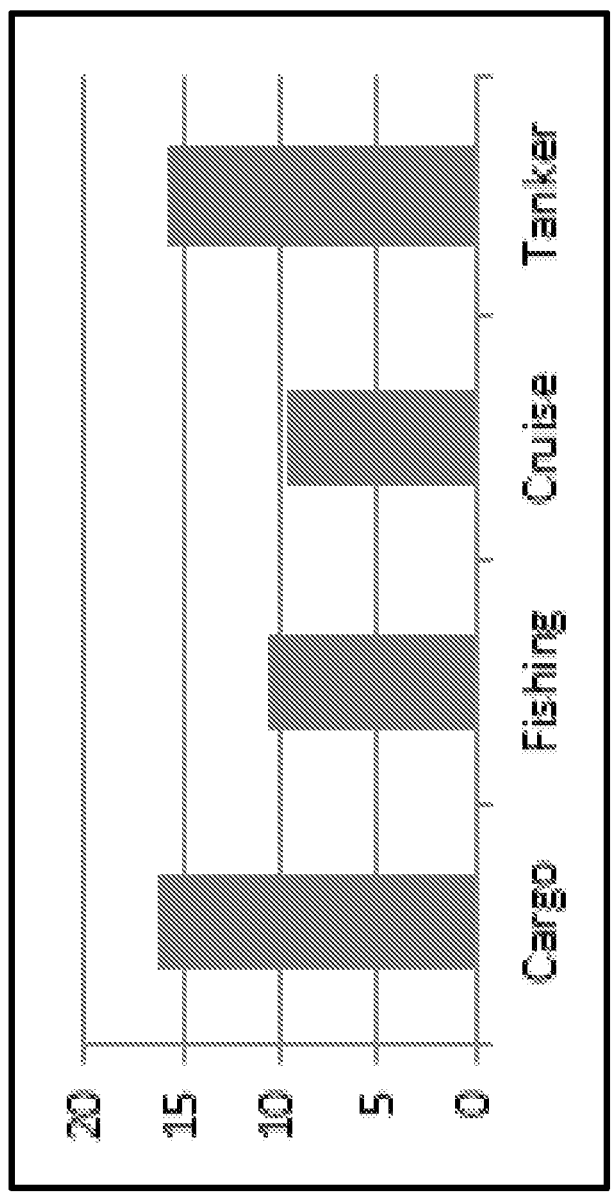
FIG. 5C is a graphical representation of a data mining model, according to one or more aspects of the disclosure.

FIGS. 5B-5D show three examples of graphical representations of data models based on input data, such as the raw shipping data shown in FIG. 5A. FIG. 5B is a graphical representation of a spatial data model, FIG. 5C is a graphical representation of a data mining model, and FIG. 5D is a graphical representation of a pattern mining model. Additionally, many additional data model types may be supported by the data analytics system 200, and further custom data model types may be defined by users via the system 200.

The data model type selected in step 301 may correspond to one or more of the data model types predefined by the data analytics system 200 and/or custom types defined by users via the software API 210. For example, a statistical model may take an input data set and apply mathematical equations to the data set to determine relationships between fields of the data set. A spatial statistical model (e.g., FIG. 5B) may take an input data set and quantize the data set members in space and/or time. For spatial statistical modeling, a statistical function may then operate on all data items that fall within each space/time quantization. Examples of spatial statistical models include "heat maps" that count the number of entities that visit a certain space during a certain time interval (e.g., ships passing through a geographic grid region during a time window). A data mining model may take an input data set and group the data by one or more keys. In data mining models, a user-defined function may then operate on all records that fall within each group. Data mining models (e.g., FIG. 5C) may be visualized, for example, as bar, graph, and pie charts. A pattern mining data model (e.g., FIG. 5D) may take an input data and examine each item for a set of pre-defined features. The pattern mining data modeling process may then count the number of times that set of features co-occur in other records. For efficiency, co-occurrences in pattern mining data modeling may consider only features that occur with a certain frequency and/or may consist of only the N most common patterns involving those features.

In addition to the data model types shown graphically in FIGS. 5B-5D, other data model types may be supported by the data analytics system 200. For example, a graph model may represent an input data set as a set of vertices connected by edges, each of which may have an associated value or weight. In some types of graph modeling, the actual model that may be interesting to the user might not be the initial graph built from the input data, but instead may be a sub-graph (or set of sub-graphs) identified by running a graph algorithm (e.g., a clique algorithm) over the initial graph. Additionally data model types, such as clustering models, Bayesian models, machine learning models, and custom user-defined model types may be supported by the data analytics system 200, and any of the above data model types may be selected (e.g., via an input parameter to a software API function) by the user in step 301.

In step 302, a user selection of one or more model/data record grouping parameters may be received, for example, via the software API 210. For example, the software API 210 may support functions to allow input data sets to be grouped, or quantized, into groups that may be modeled separately. In certain embodiments, the grouping functions supported by the software API 210 and/or other components within the data analytics system 200 may be based on the data model type selected in step 301. For example, when a spatial statistical data model is selected for a shipping sensor data namespace, the software API 210 may provide grouping functions that allow the input data to be grouped by space (e.g., geographic grids or regions) and/or time (e.g., time intervals), to form space-time groups of input data to create a plurality of data models. However, for different data model types and/or different namespaces (i.e., different types of data having different key values and name/value data pairs), then the software API 210 may provide other grouping functions which are more appropriate for the selected namespace and data model type.

In various examples, grouping functions provided by the software API 210 may allow users to group input data sets based on field values. Referring again to the shipping data example, a user might want to group the shipping data by a "ship_type," a "ship_ower," and/or a "ship_country" key within the input data set. Thus, software API 210 may expose a model grouping function allowing the user to select specific ship types, owners, and countries, etc., for grouping the input data prior to the creation of corresponding data models for each group.

In various examples, based on the model data type and/or namespace, the software API 210 may support grouping records by time and/or space. For example, a user may be able group the input data into time windows, or different time characteristics (e.g., hour of the day, day of the week, month of the year, etc.) based on the time associated with each input data record. For instance, if the input data for the data model includes a week of shipping sensor data, then a grouping function may accept a parameter allowing the user to model the input data in one day time windows, while another grouping function and/or parameter may allow the user to model the input data by time of day (e.g., morning, afternoon, etc.) over the entire week. For grouping based on space (e.g., for data input sets having geographic coordinates) an API function may be provided that allows the user to input latitude and/or longitude parameters to define bounding box (e.g., 1 degree bounding box, 15 degree bounding box, or boundary of the country that the input parameter location falls within, etc.). Parameters for grouping input data by space may define sizes or distances (e.g., 1 degree box) or geographic locations (e.g., Europe).

In step 303, the input data to be used for building the data model(s) may be received (e.g., via the ETL tool 205), or may be retrieved (e.g., from the distributed storage system 230) if the input data was previously stored. In certain embodiments, one or more data extraction, transformation, and/or load processes executing within the data analytics system 200 may be provided to receive and transform sensor data (or other types of data) from an organization into a format required for model building within the system 200. The input data received (or retrieved) in step 303 may include data from multiple sensors and/or domains.

Receiving data in step 303, for example, by an ETL tool 205 within the data analytics system 200, may include establishing a connection to a data source and reading the inbound data. The ETL tool 205 may be configured to connect to local or remote data sources, and need not be limited to receiving a single data inbound data stream or single protocol. The software API 210 accessed by the ETL tool 205 may support both streaming and non-streaming protocols, and streaming implementations (e.g., for remote HTTP streaming sources that support long polling) and non-streaming implementations (e.g., for local file and remote HTTP sources) also may be supported by the data analytics system 200. The software API 210 may include public interfaces allowing users to define their own connections to data sources as well.

Step 303 also may include a parsing step in which the input data received from the data source(s) is transformed into message objects, and a validation step to ensure that the message keys and values in message objects are present and valid before sending the parsed message object. Message objects may be standard format objects that can be received and read by the other components within the data analytics system 200. Parsing the input data in step 303 may be performed using one or more parsing objects provided by the data analytics system 200 (e.g., implementations for parsing CSV and JSON data formats). Alternatively, users of the system 200 may define and use their own parsing objects via the software API 210.

When a validation is performed in step 303, message objects analyzed by a validation object in the software API 210 having a set of validation rules to confirm the validity of message keys and values in the message objects. In some examples, a successful validation may result in a "data in" event, described above in FIG. 2B, after which the valid message object may be transmitted to the stream processing system 221. Message objects for failed validations may be persisted into storage 230, or may be dropped altogether. The software API 210 of the data analytics system 200 may have multiple built-in validation methods for numeric, character, and timestamp data types, and also may support functions allowing users to create and define their own validation rules using the public interfaces of the API 210.

Rather than receiving a new data stream in step 303, a previously stored data set may be retrieved (e.g., from distributed storage 230) to be used as the input data for building one or more data models. For example, an input data stream that previously has been received via the ETL tool 205, parsed and validated, and then stored in the distributed storage 230, may be retrieved from the storage 230 in step 303. The software API 210 may provide functionality that allows users to review and select previously stored data streams within the distributed storage 230 to use when building data models. For example, a previously stored data stream that was used to create one or more data models having certain data model types and groupings may be persisted within the distributed storage 230, so that it may be used in the future to create additional data models potentially having different model types and groupings. Additionally, new data streams may be combined with previous data streams persisted within the distributed storage 230, and the combined new and old data may be applied to create new data models and/or update existing data models.

In step 304, one or more data models may be created by the data analytics system 200 using a set of computing resources (e.g., cloud computing resources 220) to apply the input data received in step 303 to the one or more model definitions determined in steps 301-302. As described above, data models correspond to techniques for describing large quantities of data in more compact and manipulable forms. The data models created in step 304 may describe the behaviors observed within the input data, such that the data model may be used to compare and classify new data against the observed behaviors.

The process of building a data model in step 204 may include applying a function, known as a model definition, to an input data set in order to produce the model. The model definition may correspond to the data model type received in step 301 (e.g., statistical, spatial statistical, graphic, pattern mining, etc.) For example, if a pattern mining data model type is selected via the API 210 in step 301, then in step 304 the data analytics system 200 may use a parallel frequent pattern mining algorithm against the input data to create the model, while other model creation algorithms may be used for other data model types/model definitions.

The model building in step 304 may include a preprocessing step in which each record in the input data set is examined, filtered and/or modified, before determining whether to include the record when building the model. The preprocessing of data records may depend on the data types of the records and other factors. For example, a preprocessing step for numeric data may round decimal values to the nearest whole number or other level of precision, and a preprocessing step for text data may convert strings to upper or lower case. Other types of preprocessing may include, for example, using a dictionary to find synonyms of text data, determine if a location data point is within an X mile radius of a central location, or determine if a timestamp is within an X minute window of a central time. For records that pass the preprocessing step, the preprocessing results (e.g., altered or new key-value pairs) may be used in the subsequent model building steps described below, while records that do not pass the preprocessing step may be persisted in the storage 230 for future analysis, or may be dropped. Users may define their own filtering using public functions of the software API 210 to be used during the preprocessing step.

The model building in step 304 also may include a sorting step in which the data records that have passed the preprocessing step (if performed) are sorted into groups. As described in reference to step 302, users may use model grouping functions exposed by the software API 210 to group, or quantize, a set of input data into groups that may be modeled separately, for example, grouping based on keys and field values, times, and geographic locations associates with data records. The sorting step in 304 may implement the user-selected groupings by sorting and filtering the input data set in accordance with the grouping functions and grouping parameters provided by the user. Using sorting, similar data records may be modeled separately based on user-defined key values, times, locations, or other grouping parameters.

After preprocessing and sorting the input data (if performed), one or more models may be built in step 304 by executing the appropriate algorithm over the sorted groups of data records to produce models. If the sorting has been performed, for example, based on grouping functions invoked via the software API 210, then a separate data model may be created for each group of data records. For example, if time sorting has been applied in which the input data has been grouped into different time windows, then a different data model may be created for each time window. Such examples may be used to perform time series type analysis to develop an understanding of changes of the modeled data over time. As another example, if field value sorting has been applied for shipping records based on the vessel type (e.g., cargo, fishing, cruise, or tanker, etc.), then a different data model may be created for each different vessel type.

In addition to the built-in data model algorithms provided by the software API 210 (e.g., algorithms for statistical models, spatial statistical models, graph models, pattern models, clustering models, and machine learning models), the software API 210 may provide functions that allow users to define their own model algorithms for their own model types/definitions.

The modeling algorithms supported by the software API 210 and used in step 304 may be scalable, so that the data models may be built using the parallel computing resources of the cloud 220. In such examples, the stream and batch processing components 221-222 may be configured to use their underlying software components (e.g., MapReduce) to determine a set of parallel computing resources, for example, based on the algorithm and the size of the data set, and build the data model using the parallel computing resources. In other examples, certain modeling algorithms may not be amenable to a parallel computing infrastructure (e.g., user-defined modeling algorithms), and thus the data model(s) resulting from such algorithms may be built on a single server.

In certain embodiments, although the user and/or organization may have access to large quantities of data, they might not know how many entities will be modeled when the model building process is performed. For example, after receiving input data or a new data stream of shipping data (e.g., FIG. 5), the user or organization may have no idea how many distinct ships are represented in the shipping data. Similarly, if a user invokes grouping functions to filter and/or group the data records for modeling according to certain grouping parameters (e.g., time and space groups), then the user may have no idea how many models will be created based on the grouping parameters, or the amount of computing resources required to build the requested models. In such cases, the data analytics system 200 may make these determinations during the model building process, and may assist the user in navigating though the resulting model set.

Appendix C attached hereto includes two source code fragments illustrating examples of building data models by invoking code from a software API 210 of a data analytics system 200. As shown in Appendix C, these examples relate to building models for shipping data. The first code sample in Appendix C invokes a model definition function (i.e., DataMiningModelDefinition( )), indicating that model type is a data mining model. After creating the model definition, the code in this example includes several calls to functions (e.g., model grouping functions) to describe how the model should be built, for example, by computing data fields, filtering out records, and grouping records based on certain data record values. Finally, a model creation function is invoked to create the data model of the specified model type in accordance with the model grouping parameters and functions called. In this example, the model creation function (i.e., "ModelEvent.sendevent") builds a data model of the selected data model type (i.e., a data mining model), and in accordance with the model grouping parameters and functions called, by submitting the model definition object to a cloud computing platform.

In step 305, one or more data models built in step 304 may be retrieved (e.g., from the distributed storage 230), and one or more model visualization functions may be invoked within the data analytics system 200 to graphically display the data models. FIGS. 5B-5D, discussed previously, show examples of graphical representations of a spatial data model, a data mining model, and a pattern mining model, respectively. Each data model type supported by the data analytics system 200 may have one or more default visualization methods. For example, statistical and pattern models may be displayed as tables and charts, spatial statistical models may be displayed as maps, graph models may be displayed as graphs, etc. Additionally, the software API 220 may provide functions that allow users to develop custom graphical user interfaces (GUI's) to visualize data models (and other data, such as classifications, predictions, alerts, etc.) to meet the needs of the user and organization.

To visualize (i.e., graphically display) a data model, the data model may first be identified and selected. The software API 210 may provide functions to allow users to retrieve lists of the data models stored within (or available to) the data analytics system 200. In certain embodiments, the system 200 may include programming interface functions and/or a web-based user interface to allow users to search for and select data models for viewing based on namespace (e.g., shipping data models, banking data models, etc.), model types (e.g., pattern models, spatial models, etc.), and/or based on other factors such as ranges of data field values, times, locations, etc.

Figure 6:
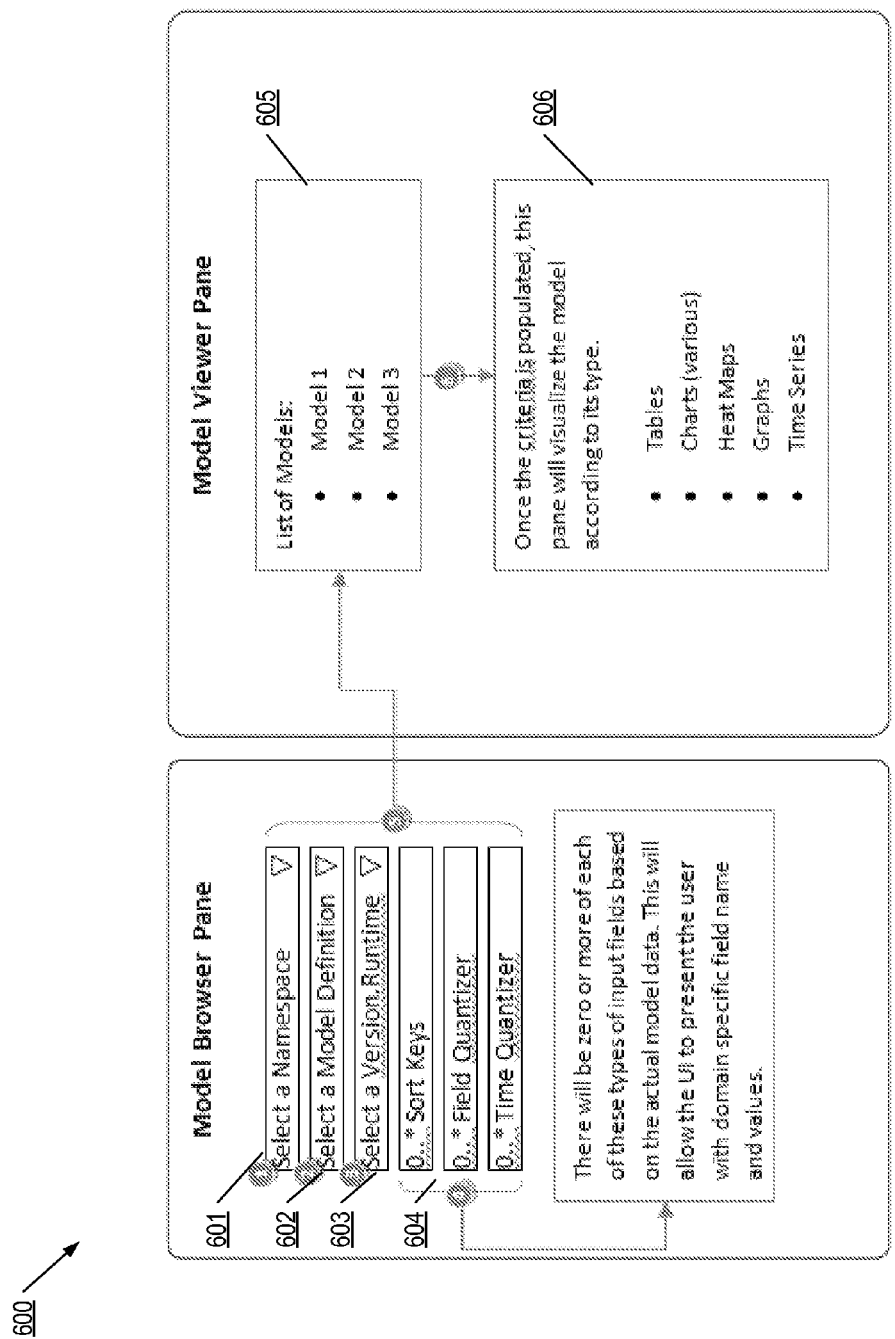
FIG. 6 is an illustrative user interface showing example steps for searching for and selecting a data model for visualization, according to one or more aspects of the disclosure.

As an example, referring to FIG. 6, an illustrative user interface 600 is shown allowing users to search for and select a data model for visualization. In this example, the user interface 600, which may be provided as a web-based user interface within a web browser or other user application 240, may display a dropdown list 601 of all namespaces associated with the user or the user's organization. After a namespace is selected by the user (e.g., shipping data models), the user interface 600 may load a list of available model definitions 602 for that namespace. After a model definition is selected by the user (e.g., spatial shipping data models), the user interface may load available versions and runtimes 603 associated with the selected model definition. After a version and runtime is selected by the user, the system 200 may load a list of available data values for which the user can find and view a specific model. For example, the user interface may dynamically display data entry components 604 based on data model metadata corresponding to data field keys, values, times, locations, etc. The user may select a desired combination of the available data values within such data entry components 604 on which to filter, group, and/or sort the set of data models within the selected version and runtime. After the user applies the desired filtering, grouping, or sorting, if any, the user interface may display the list of data models 605 that match the user's criteria. The user may then select a data model for visualization, at which time the data analytics system 200 may load the model and apply the appropriate visualization technique for that model and display the model in a visualization pane 606.

Although the above example describes retrieving and displaying a data model, similar steps, functions and/or user interfaces may allow users to retrieve and visualize additional data within the data analytics system 200, for example, classifications, predictions, alerts, and records.

Figure 4:
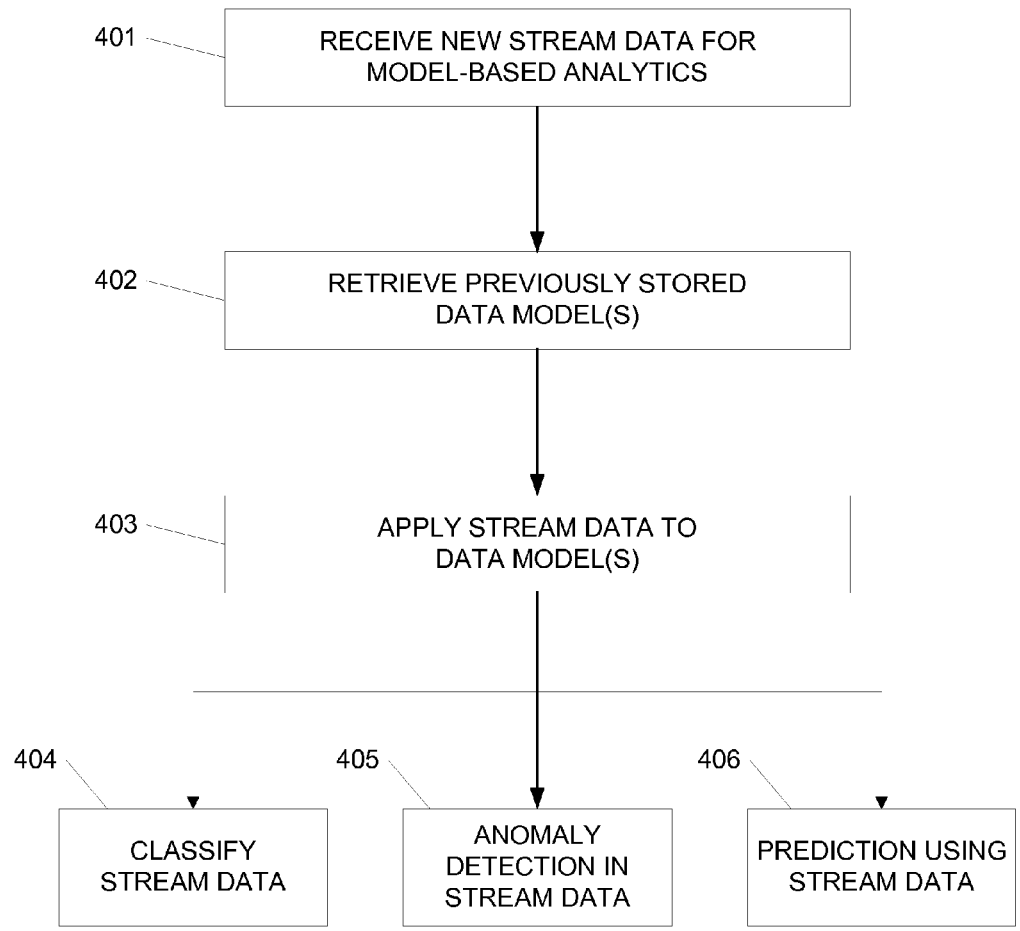
FIG. 4 is a flow diagram illustrating an example process for retrieving data models and performing model analytics functionality including classification, anomaly detection, or prediction, according to one or more aspects of the disclosure.

Referring now to FIG. 4, a flow diagram is shown illustrating an example process for retrieving data models and performing model-based analytics, in accordance with one or more illustrative aspects described herein. The embodiments described in reference to FIG. 4, and the other embodiments described herein, may be implemented by the system components and software described above in reference to FIGS. 2A-2B, for example, the ETL component 205, software API 210, discovery and export component 215, and distributed stream and batch processing components 221-222, along with other components. In certain examples, the steps and process described herein may be performed by and/or in combination with computing devices 110, for example, one or more servers of a data analytics system, in communication with one or more model building and model-based analytics client devices.

In step 401, stream data is received to initiate model-based analytics within the system 200. As discussed above in reference to FIG. 2B and in step 303, new data streams corresponding to sensor data (or other types of organization data) may be received from one or more data sources. As described above, the received stream data may be parsed, transformed, and/or validated by various components within the data analytics system 200, such as an ETL tool 205. Additionally, the receipt of the stream data in step 401 may initiate an event within the data analytics system 200, to transform the received data into messages and forward the messages to a distributed stream processing component 221 or a distributed batch processing component 222.

In step 402, one or more data models stored within the data analytics system 200 may be identified as related to the received stream data, and the related data models may be retrieved by the stream or batch processing components 221-222. For example, new stream data received by the system may be identified as originating from the same data sources, relating to the same organization, and/or containing the same data fields and same types of data. For instance, new stream data received via an incoming data stream 250 may correspond to the same data used to build an existing model, but the data may correspond to a different time period (e.g., updated data from the current time cycle) or a different geographic location (e.g., corresponding data from a different region). In certain examples, the new stream data may be identified and matched to existing data models automatically by processes within the system 200, while in other examples the new stream data may be identified and matched to existing data models based on user input via the programming interfaces of the software API 220 or a user interface provided by the system 200. For instance, the user may receive an alerted in response to a new data steam arriving at the ETL tool 205 or other software component, and user interface may be provided to allow the user to match the new stream data to an existing data model.

In step 403, the new stream data is applied to one or more existing data models to perform model-based analytics, such as the classification and prediction of new data based on existing data models. For example, new stream data may be classified as fitting one of a plurality of data models (classification), or may be classified as either fitting or not fitting an existing data model (anomaly detection). Model-based analytics also may include predictions of unknown data or future data based on the comparison of new data to older data models. In the examples described below, classification (step 404), anomaly detection (step 405), and predictions (step 406) may be performed using build-in classifiers and predictors within the software API 220 that may be invoked by users. Alternatively, the software API 220 may support functions that allow users to define, create, and execute custom classifiers and predictors within the data analytics system 200.

In step 404, a classifier (or classification function) may be executed on the new stream data against one or more existing data models. The classifier function may executed by a distributed stream processing component 221 to provide real-time or near real-time classification of incoming stream data. In certain examples, the distributed stream processing component 221 may use multiple data models to produce a classification for new data by determining the degree to which the new data fits each existing data model. For example, a shipping application may have existing data models for fishing ship behavior, cruise ship behavior, and sailing craft behavior, among other types of shipping vessel behavior. In this case, the classifier function could compare the behavior of an unknown vessel (i.e., the new stream data) against the data models for each existing shipping vessel, and report the model to which the unknown vessel matches most closely.

In step 405, an anomaly detection function may be executed on the new stream data against one or more existing data models. Anomaly detection may be a variation of classification, and in certain examples, a classifier may be used to perform the anomaly detection of step 405. For instance, a classifier or other function executing within a processing component 221-222 may classify new data as "anomalous" if the new data does not fit an existing data model or set of data models.

In step 406, a predictor (or prediction function) may be executed on the new stream data against one or more existing data models. As an example, an existing data model may be used to represent a sequence of state transitions observed in the data that went into the model. In this example, the new data may be used to represent the current state and the existing data model may be used to predict what states might follow next after the current state. The predictor may generate a number of possible next outcomes, along with a statistical representation of the likelihood of each possible next outcome.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. One or more non-transitory computer-readable media storing computer-executable instructions which, when executed on a computer system, provide a software package comprising:
    a model definition function configured to receive a model type parameter corresponding to one of a predetermined set of model types defined within the software package;
    a plurality of model grouping functions, each model grouping function configured to receive one or more data record grouping parameters, wherein each of the predetermined set of model types has a corresponding set of data record grouping parameters defined within the software package;
    a plurality of model preprocessing functions configured to analyze an input data set to form a set of model input data records,
        wherein a first model preprocessing function, of the plurality of model preprocessing functions, is configured to modify the input data set by performing one or more of rounding a numeric value, converting a character from lowercase to uppercase, or obtaining synonyms of text data, and
        wherein a second model preprocessing function, of the plurality of model preprocessing functions, is configured to filter the input data set based on whether a location data point is within a preset distance of a preset location,
    a model creation function configured to create a data model by applying the set of model input data records to a model definition defined by the model type parameter received via the model definition function and the one or more data record grouping parameters received via the plurality of model grouping functions, wherein the data model represents a sequence of state transitions observed in the set of model input data records; and
    a model analytics function configured to
        receive a data stream comprising data,
        receive a user input, of a user, identifying the data model from a plurality of data models as being related to the data stream, and
        predict one or more states of the data likely to occur following a current state of the data using the data model.

2. The one or more non-transitory computer-readable media of claim 1, wherein the software package comprises at least one model grouping function configured to receive a data record field value parameter, at least one model grouping function configured to receive a time parameter, at least one model grouping function configured to receive a geographic location parameter, at least one model grouping function configured to receive an owner of one or more shipping vessels parameter, and at least one model grouping function configured to receive a shipping vessel type parameter.

3. The one or more non-transitory computer-readable media of claim 1, wherein the model analytics function is configured to identify the data model as being related to the data stream based on the data having a same data field as the set of model input data records.

4. The one or more non-transitory computer-readable media of claim 3, wherein the model creation function is further configured to:
    determine either a batch processing mode or a real time processing mode for creating the data model; and
    use a set of computing resources to create the data model in accordance with either the batch processing mode or the real time processing mode.

5. The one or more non-transitory computer-readable media of claim 1, wherein the model creation function is configured to create the plurality of data models, wherein a number of data models created is based on the one or more data record grouping parameters received via the plurality of model grouping functions.

6. The one or more non-transitory computer-readable media of claim 5, wherein the model analytics function is configured to:
    retrieve the plurality of data models;
    apply another incoming data stream to each of the plurality of data models; and
    classify the another incoming data stream into one of the plurality of data models.

7. The one or more non-transitory computer-readable media of claim 1, wherein the model analytics function is configured to generate a statistical representation of a likelihood of occurrence for each of the one or more states.

8. A method, comprising:
    receiving, by a computing device, a model type parameter via a model definition function of a software package, the model type parameter corresponding to one of a predetermined set of model types;
    providing a set of one or more grouping functions based on the model type parameter;
    receiving one or more data record grouping parameters via the set of one or more grouping functions;
    executing a plurality of model preprocessing functions configured to analyze an input data set to form a set of model input data records,
        wherein a first model preprocessing function, of the plurality of model preprocessing functions, is configured to modify the input data set by performing one or more of rounding a numeric value, converting a character from lowercase to uppercase, or obtaining synonyms of text data, and
        wherein a second model preprocessing function, of the plurality of model preprocessing functions, is configured to filter the input data set based on whether a location data point is within a preset distance of a preset location,
    receiving a function call of a model creation function associated with the model type parameter and the one or more data record grouping parameters;
    in response to the function call of the model creation function, creating a data model by applying the set of model input data records to a model definition defined by the model type parameter and the one or more data record grouping parameters, wherein the data model represents a sequence of state transitions observed in the set of model input data records;

receiving a data stream comprising data;
receiving a user input, of a user, identifying the data model from a plurality of data models as being related to the data stream; and
predicting one or more states of the data likely to occur following a current state of the data using the data model.

9. The method of claim 8, wherein the one or more data record grouping parameters received via the set of one or more grouping functions comprises at least one of a data record field value parameter, a time parameter, a geographic location parameter, an owner of a shipping vessel parameter, and a shipping vessel type parameter.

10. The method of claim 8, wherein identifying the data model as being related to the data stream is further based on the data having a same data field as the set of model input data records.

11. The method of claim 10, wherein creating the data model further comprises:
determining either a batch processing mode or a real time processing mode for creating the data model; and
using a set of computing resources to create the data model in accordance with either the batch processing mode or the real time processing mode.

12. The method of claim 8, further comprising:
determining a plurality of data model definitions based on the model type parameter and the one or more data record grouping parameters; and
creating the plurality of data models corresponding to a plurality of groups created based on the one or more data record grouping parameters, by applying the set of model input data records to each of the plurality of data model definitions.

13. The method of claim 12, further comprising:
retrieving the plurality of data models;
applying another incoming data stream to each of the plurality of data models; and
classifying the another incoming data stream into one of the plurality of data models.

14. The method of claim 8, further comprising:
providing a likelihood of occurrence for each of the one or more states.

15. One or more non-transitory computer-readable media storing computer-executable instructions which, when executed on a computer system, cause the computer system to:
invoke a model definition function, and pass into the model definition function a model type parameter corresponding to one of a predetermined set of model types accepted by the model definition function;
invoke one or more model grouping functions from a set of available model grouping functions, passing into the one or more model grouping functions one or more data record grouping parameters, wherein the set of available model grouping functions is based on the model type parameter passed into the model definition function;
invoke a plurality of model preprocessing functions configured to analyze an input data set to form a set of model input data records,
wherein a first model preprocessing function, of the plurality of model preprocessing functions, is configured to modify the input data set by performing one or more of rounding a numeric value, converting a character from lowercase to uppercase, or obtaining synonyms of text data, and
wherein a second model preprocessing function, of the plurality of model preprocessing functions, is configured to filter the input data set based on whether a location data point is within a preset distance of a preset location,
invoke a model creation function, the model creation function configured to create a data model by applying the set of model input data records to a model definition defined by the model type parameter passed into the model definition function and the one or more data record grouping parameters passed into the one or more model grouping functions, wherein the data model represents a sequence of state transitions observed in the set of model input data records; and
invoke a model analytics function, the model analytics function configured to receive a data stream comprising data, receive a user input, of a user, identifying the data model from a plurality of data models as being related to the data stream, and predict one or more states likely to occur following a current state of the data using the data model.

16. The one or more non-transitory computer-readable media of claim 15, wherein the one or more model grouping functions comprise one or more of a model grouping function configured to receive a data record field value parameter, a model grouping function configured to receive a time parameter, a model grouping function configured to receive a geographic location parameter, a model grouping function configured to receive an owner of one or more shipping vessels parameter, and a model grouping function configured to receive a shipping vessel type parameter.

17. The one or more non-transitory computer-readable media of claim 15, wherein the model analytics function is configured to identify the data model as being related to the data stream based on the data having a same data field as the set of model input data records.

18. The one or more non-transitory computer-readable media of claim 17, wherein invoking the model creation function comprises passing into the model creation function a processing mode parameter corresponding to either a batch processing mode or a real time processing mode for creating the data model.

19. The one or more non-transitory computer-readable media of claim 15, wherein the invoked model creation function is configured to create the plurality of data models, wherein a number of data models created is based on the one or more data record grouping parameters passed into the one or more model grouping functions.

20. The one or more non-transitory computer-readable media of claim 15, wherein the invoked model analytics function is configured to generate a likelihood of occurrence for each of the one or more states.

21. The one or more non-transitory computer-readable media of claim 1, wherein the software package further comprises:
a classification function configured to compare behavior of a shipping vessel against one or more data models for different shipping vessels to identify which one of the one or more data models the behavior of the shipping vessel most closely matches.

* * * * *